(12) United States Patent
Crisinel et al.

(10) Patent No.: US 6,514,459 B1
(45) Date of Patent: Feb. 4, 2003

(54) PROCESS AND PLANT FOR THE TREATMENT OF AN ARTICLE WITH OZONIZED WATER

(75) Inventors: Pascal Crisinel, Guyancourt (FR); Lucie Prost, Paris (FR)

(73) Assignee: L'Air Liquide Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 09/448,437

(22) Filed: Nov. 24, 1999

(30) Foreign Application Priority Data

Nov. 24, 1998 (FR) .............................................. 98 14783

(51) Int. Cl.⁷ .......................... A61L 2/18; A23L 3/358; A23L 3/3589
(52) U.S. Cl. .......................... 422/31; 422/300; 99/534; 426/331; 426/532; 426/474
(58) Field of Search .......................... 422/28, 31, 292, 422/321, 300; 426/474, 331, 532; 99/534, 536

(56) References Cited

U.S. PATENT DOCUMENTS 4,849,237 A * 7/1989 Hurst ......................... 426/332

FOREIGN PATENT DOCUMENTS

| EP | 0331296 A1 | * | 2/1989 |
|----|------------|---|--------|
| EP | 0 331 296 | | 9/1989 |
| JP | 56 106547 | | 8/1981 |
| JP | 02 145178 | | 6/1990 |
| JP | 02 203739 | | 8/1990 |
| JP | 06 046751 | | 2/1994 |
| JP | 06 165637 | | 6/1994 |
| JP | 07 236461 | | 9/1995 |

* cited by examiner

Primary Examiner—Elizabeth McKane
(74) Attorney, Agent, or Firm—Burns, Doane, Swecker & Mathis, L.L.P.

(57) ABSTRACT

A process for the treating of a product comprising the steps of:
contacting the product with a solution of ozonized water subjected to stirring during all or part of the contacting, wherein all or part of the stirring is hydraulic in origin;
recirculating at least a portion of the solution contacted with the product to one or more points where the contacting step occurs so as to establish turbulent water conditions capable of allowing achievement of a sufficient contact time between the product and the ozone dissolved in the water to attain a required level of treatment.

18 Claims, 5 Drawing Sheets

PROCESS AND PLANT FOR THE TREATMENT OF AN ARTICLE WITH OZONIZED WATER

CROSS REFERENCE TO RELATED APPLICATION

The present invention claims the benefit under 35 U.S.C. §119 of French application 98 14783 filed Nov. 24, 1998, in France, the disclosure of which is hereby incorporated by reference.

BACKGROUND OF THE INVENTION (i) Field of the Invention

The present invention relates to a process and a plant for the treatment of products, in particular of food products, with ozonized water, the aim being in particular, depending on the case, to bleach, disinfect or deodorize the products thus treated.

(ii) Description of the Related Art

It is known that the literature relating to the treatment with ozone of articles such as medical instruments or else products such as food products, in instruments or else products such as food products, in particular in the field of washing food products with ozonized water (seafood, such as fish or Crustacea, but also fruit and vegetables, and the like), is extremely rich; reference may be made in particular to the documents Fr-385,815, EP-294,502, Fr-797,928, Ca-2,102, 362 or U.S. Pat. No. 4,559,902.

One of the applications which is highly promising today is actually the washing of food products with ozonized water, in particular the washing of fruit and vegetables or seafood. These washing operations with ozonized water have been very particularly proposed as replacement for washing with chlorinated water, chlorine being progressively subject to very severe restrictions in this industry, indeed even banning pure and simple.

In these known processes for washing with plain water or optionally chlorinated water, it is known that the effectiveness of the washing is related to the energy employed and consequently the water in the tank is commonly stirred, typically by the injection of compressed air into the solution. The role of this stirring is in particular to detach dirt and other organic loads from the products to be treated but also to replace the disinfectant molecules at the surface of these products, in order to thus enhance disinfectant/product transfer and to improve the effectiveness of the washing.

Studies brought to a successful conclusion by the Applicant Company have allowed it to be shown that, in the case of washing with ozonized water, such stirring by the pneumatic route is undesirable, in so far as it promotes phenomena of degassing and thus the loss of a portion of the ozone dissolved in the washing water.

The stirring conditions to be put in place in the case of washing with ozonized water are in fact, according to these studies, even more critical and the following reasons may in particular be put forward for this:

ozone is a much more powerful oxidizing agent than chlorine and it results in a much greater "exhaustion" when brought into contact with the products. This exhaustion phenomenon is characterized, for the majority of products, by a sudden decrease in the content of ozone in the solution in the first contact, which decrease is related to the organic load of the products and to their exchange surface area (for example, the case of crudités, where the exchange surface area is greatly increased because of the divided state);

coupling in this instance with efficient stirring is then even more crucial (homogenization of ozone in the tank).

SUMMARY OF THE INVENTION

The present invention is targeted in particular at solving the above-mentioned technical problems.

The present invention relates generally to a process for the treating of a product comprising the steps of:

contacting the product with a solution of ozonized water subjected to stirring during all or part of the contacting, wherein all or part of the stirring is hydraulic in origin;

recirculating at least a portion of the solution contacted with the product to one or more points where the contacting step occurs so as to establish turbulent water conditions capable of allowing achievement of a sufficient contact time between the product and the ozone dissolved in the water to attain a required level of treatment.

Preferably, the process for the treatment of a product according to the invention comprises a stage in which the product is brought into contact with a solution of ozonized water in at least one treatment tank fed with ozonized water, the solution being subjected to stirring during all or part of the contacting phase. All or part of the stirring is hydraulic in origin and the recirculation of at least a portion of the solution in the tank is established in order to reintroduce this recirculated solution at one or more points in the structure of the tank, making it possible by this reintroduction to establish, within the tank, turbulent water conditions capable of allowing the achievement of a sufficient contact time between the product and the ozone dissolved in the water to attain the required level of treatment.

The process according to the invention can also adopt one or more of the following characteristics:

the turbulent conditions are obtained by arranging a degree of recirculation of water in the tank corresponding to 5 to 50 volumes of the tank per hour;

the content of ozone dissolved in the ozonized water feed of the treatment tank is between 0.1 and 20 ppm and more preferably between 0.5 and 15 ppm;

the content of ozone dissolved in the solution present in the treatment tank is regulated within the range of 0.1 to 10 ppm and more preferably within the range of 0.5 to 5 ppm;

the at least one treatment tank is substantially parallelepipedal in shape, thus defining a front wall of the tank, side walls and one or more walls forming the base of the tank, the inlet or inlets for recirculated solution in the structure of the tank then being positioned according to one or more combinations of the following configurations:

(i) the inlet or inlets for recirculated solution are composed of at least one linear sequence or series of injection nozzles emerging in the tank on at least one of its side walls;

(ii) the inlet or inlets for recirculated solution are composed of at least one linear sequence or series of injection nozzles emerging in the tank on its front wall;

(iii) the inlet or inlets for recirculated solution are composed of at least one knife emerging in the tank on the wall or walls forming the base of this tank;

the inlet or inlets for recirculated solution are composed of at least two linear sequences or series of injection nozzles emerging in the tank on at least one of these side walls, the linear sequences or series being operated sequentially in order to obtain the required contact time;

the inlet or inlets for recirculated solution are composed of at least two linear sequences or series of injection nozzles emerging in the tank on its front wall, the linear sequences or series being operated sequentially in order to obtain the required contact time;

the flow rate of recirculated solution injected into the tank is adjusted in order to control the progress of the products in the tank and thus to obtain the required contact time.

The present invention is based on the achievement of stirring of hydraulic type of the ozonized water in the treatment tank with the help of inflows of ozonized water recirculated from the tank which refeed the tank at chosen positions in this tank, so as to set up turbulent conditions inside the solution (which must be understood in that the tank does not have regions of water stagnation or regions with a zero velocity of displacement of the water), these turbulent conditions making it possible to achieve the sufficient contact time between the product and the ozone dissolved in the water in the tank to attain the required level of treatment.

It is also understood that the "treatment" with ozonized water according to the invention is targeted not only to the product under consideration but also according to the specifications demanded by each specific site of use, at carrying out one or more of the actions from the following actions: bleaching, disinfection or deodorization of the product.

Although, in the above and the following, the invention is very particularly illustrated in the case of food products, it is understood that it applies much more broadly to other products or articles, such as medical items and equipment. The term "product" or "article" will then be used without distinction.

Still by way of illustration, in order to give an example of the notion of "sufficient contact time between the product and the ozone" according to the invention, consideration may be given to the example of food products and more specifically of crudites, such as carrots, for which the quality of the products after treatment will be evaluated by a measurement of the TMAF (Total Mesophilic Aerobic Flora, often known in this industry as "Total Flora").

In addition to water and ozone, the aqueous treatment solution according to the invention can comprise, according to the application under consideration, additives such as acids or bases, the role of which can be in particular to adjust the pH of the medium.

On considering, in what follows, the specific case of food products, it is known that plants for the washing of food products conventionally include at least one washing tank but commonly several of these washing tanks, the water from at least one of these tanks being chlorinated, for example. According to the present invention for washing products with ozonized water, each treatment tank can therefore be the only washing tank of a line or else can be preceded or followed on the line by one or more tanks for washing with water, the water optionally comprising an additive. Each situation will depend, as will clearly appear to a person skilled in the art, on the type of product and on the initial state of cleanliness of the products treated.

Other characteristics and advantages of the invention will emerge from the following description, given solely by way of illustration and made with reference to the appended drawings.

BRIEF DESCRIPTION OF THE DRAWINGS

FIGS. 2, 2A, 2B and 2C diagrammatically and partially illustrate a plant for washing with ozonized water in accordance with the invention.

DETAILED DESCRIPTION OF PREFERRED EMBODIMENTS

Figure 1:
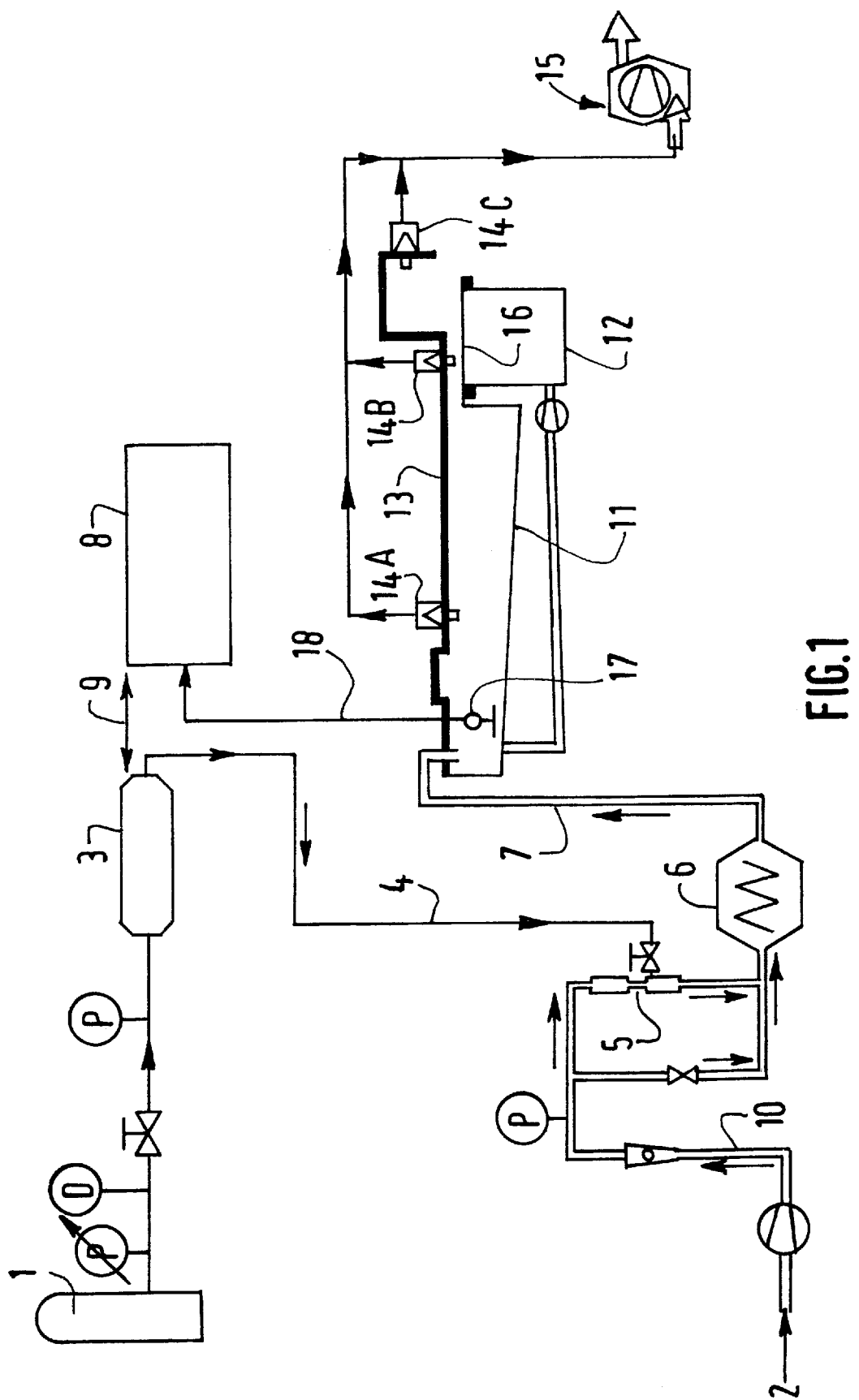
FIG. 1 is a diagrammatic representation of a plant for washing food products with ozonized water according to the sate of the art.

FIG. 1 displays a tank 11 for washing food products with ozonized water, followed by a tank 12 for recovering and recycling water, this tank 12 being surmounted by a grid 16 above which the products originating from the washing tank 11 can move and drain.

As the washing water is ozonized, the assembly composed of the washing tank 11 and the recycling tank 12 is surmounted, for reasons of safety, by a covering structure 13, represented here in bold lines, which is integral with the suction systems 14A, 14B and 14C which convey the sucked-up atmosphere to a system 15 for extraction and purification of ozone.

In order to feed the tank 11 with ozonized water, this plant has available an ozonizer 3 fed with air, or with an initial gas mixture comprising oxygen originating from a gas source 1, the resulting mixture comprising oxygen and ozone produced by the ozonizer 3 then being directed via the gas line 4 to a system for the ozonization of water.

In fact, water originating from a primary water source 2 is directed, via the line 10, to a venturi system 5, within which is injected the ozonized gas mixture moving in the line 4 (gas/liquid transfer system based on a venturi effect well known in the field of ozonization).

The water, thus ozonized in the venturi 5, subsequently arrives at a contactor 6 (for example, a static mixer or a contacting tower) before joining the washing tank 11 via the line 7.

The washing plant according to the state of the art of FIG. 1 is, moreover, regulated in the following way: an analysis 17 of the content of the ozone dissolved in the water in the washing tank 11 is carried out and conveyed (arrow 18 in the figure) to a programmable controller 8 capable of comparing the result of the measurement thus carried out with a set point for content of dissolved ozone which it is desirable to establish in the tank 11 and of carrying out a feedback operation, if appropriate, depending on the result of this comparison, on the power of the ozonizer 3 (arrow 9 in the figure), in order to increase or decrease the content of ozone in the gas mixture directed, via the line 4, to the flow of water originating from the source 2.

Figure 2:
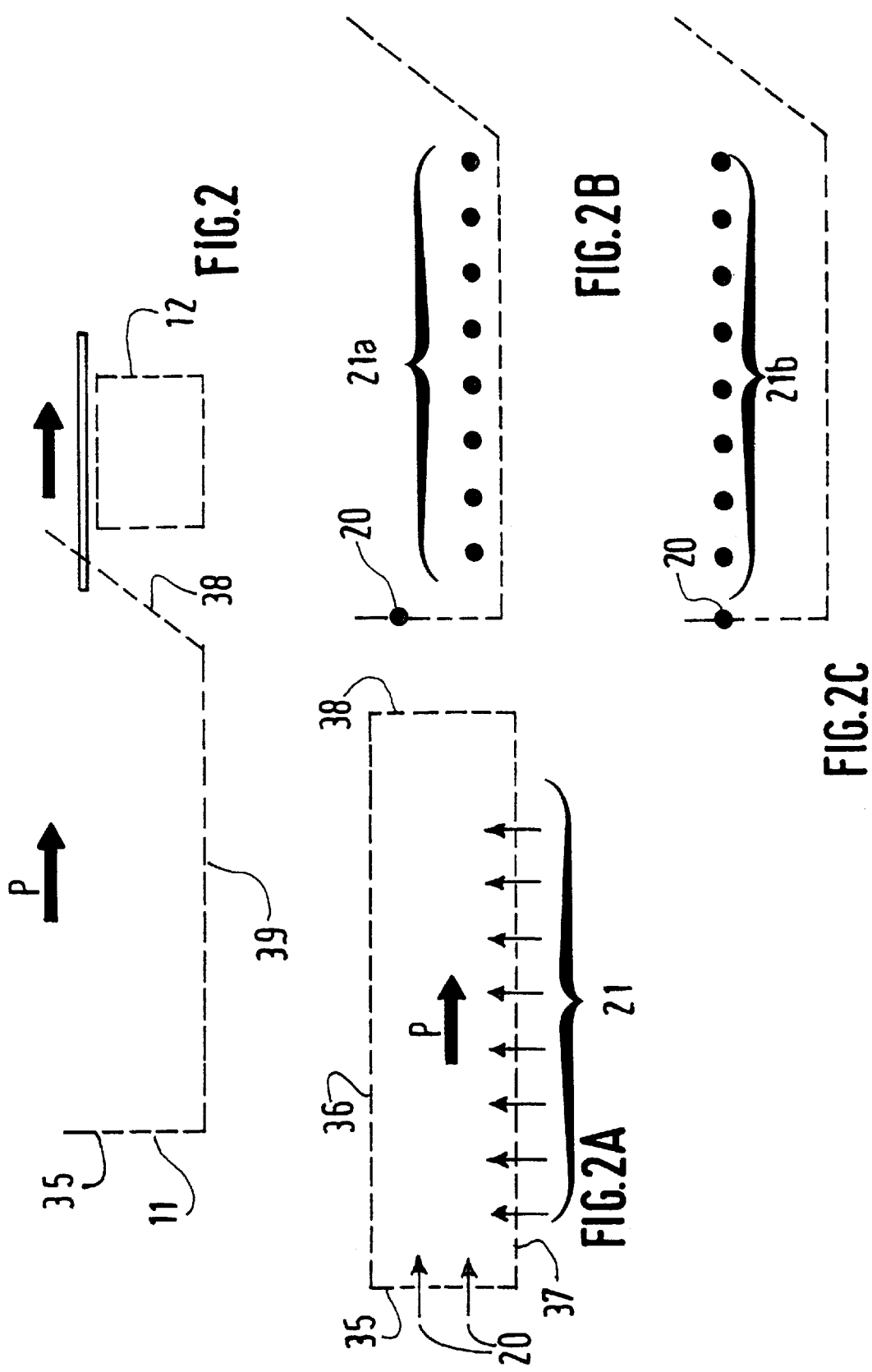

FIG. 2 displays a partial view of the plant of FIG. 1 with the presence of the washing tank 11, followed by the draining tank 12 the arrow "P", in bold lines, representing in all cases the direction of movement of the products in the plant.

In contrast to FIG. 1, the treatment tank of FIG. 2 is equipped here with a system of nozzles for the injection of ozonized water originating from the tank 12 recirculated according to the invention, making it possible to achieve hydraulic stirring of the water in the treatment tank which is capable of bringing about the necessary contact time between the products to be treated and the ozone dissolved in the water in the tank, in order to allow the level of treatment required by the site of use under consideration to be attained.

The system of inlet nozzles for recirculated water in the tank of FIG. 2 is now described in more detail in the following, with reference to the FIGS. 2A, 2B and 2C.

The tank 11 is substantially parallelepipedal in shape, thus defining, in considering the direction of progression P of the products, a front wall 35, two side walls 36 and 37, a rear wall 38 and a wall forming the base of the tank 39 (FIG. 2 illustrates a flat-bottomed tank but it is known that tanks with a substantially conical base, for example, are known in this industry).

The system for the injection of recirculated water into the tank 11 then comprises two linear sequences or series of injection nozzles, a first series of nozzles 20 in the front wall of the tank and a second series of nozzles 21 in the side wall 37 of the tank.

FIG. 2A is a top view of the tank 11, whereas FIG. 2B is a side view, i.e. in vertical and longitudinal cross section of the tank 11.

FIG. 2B then illustrates a first embodiment of the nozzles for injection of recirculated water into the tank 11; it shows front nozzles 20 and a series of eight side nozzles 21a situated in the bottom part of the tank 11.

FIG. 2C illustrates, for its part, again via a view in vertical and longitudinal cross section of the tank 11, another embodiment where the injection nozzles 20 are displayed but where, this time, the side injection nozzles 21 are situated in a top position on the side wall 37 (the side nozzles here are numbered 21b).

Of course, it might be possible, for example, to combine the injection nozzle structures of FIG. 2B and 2C by having both the presence of side nozzles in the bottom position and in the top position in the tank 11.

It can thus be seen that the embodiment of FIG. 2 is particularly effective in introducing a technical response to the problem on which the present invention is based:

the combination of the front nozzles 20 and of the side nozzles 21 makes it possible to establish hydraulic stirring of the products inside the tank, making it possible to set up turbulent water conditions inside this tank while avoiding regions of water stagnation and of zero velocity inside the tank;

such recirculated water inlets make it possible not only to control the stirring of the product in the water in the tank but also the progression of the products in the treatment tank in the direction of the draining tank 12 and therefore the overall contact time between the treated products and the ozone dissolved in the water in the tank, in order, at the departure of the products via the rear wall 38, to arrive at the level of treatment required by the site of use under consideration;

the series of front injection nozzles 20 is very particularly advantageous for certain products, in order to prevent agglomeration of the products to be treated at the head of the tank 11;

the presence of the side injection nozzles 21 is, for its part, very particularly advantageous for certain products, in order to bring about mixing and actual progression of the products in the tank;

according to an advantageous embodiment of the invention, the injection nozzles 21 can be swivelled, in order to control progression of the products and therefore the presence time of the products in the tank and therefore the contact time of these products with the dissolved ozone;

according to another advantageous embodiment of the invention, the side ozonized water injection nozzles 21 are employed sequentially, that is to say one after the other, in considering the direction of movement of the products in the tank 11, here again in order to allow better control of the progression of the products in the tank and therefore of the presence time of the products in this tank.

Figure 3:
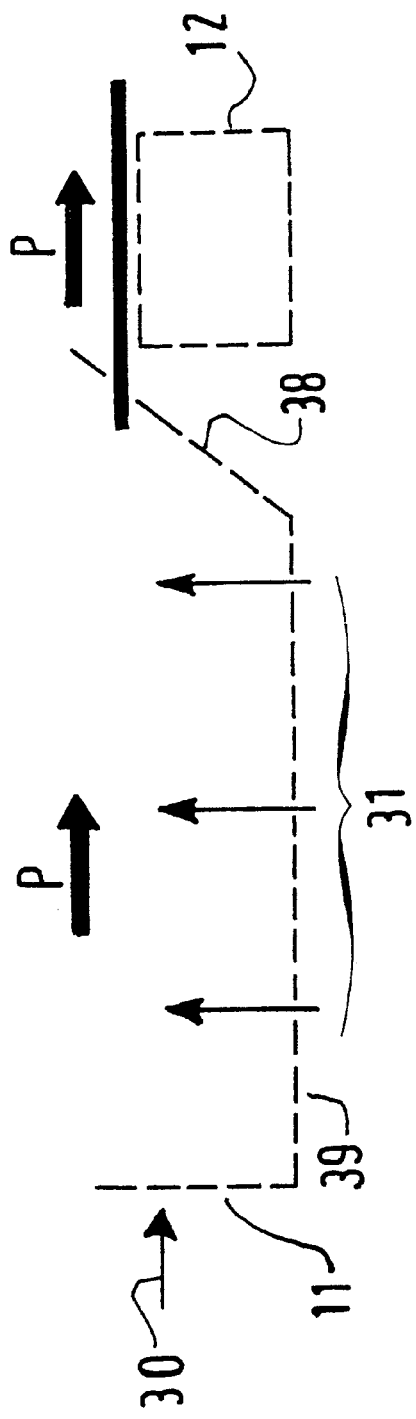
FIGS. 3 and 3A illustrate another embodiment of a plant according to the invention.
Figure 3A:
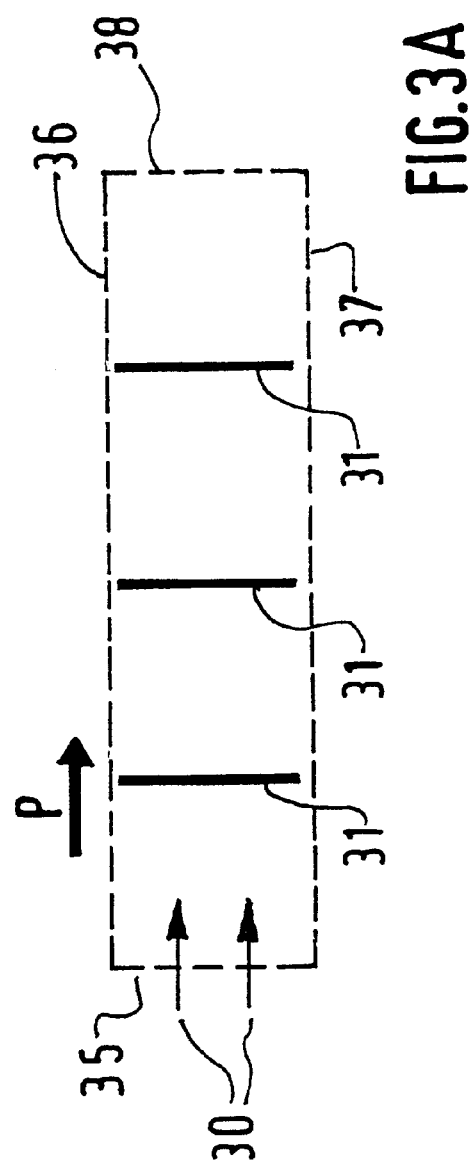

FIGS. 3 and 3A illustrate, diagrammatically and in partial view, another embodiment of a plant of the invention which again displays a tank 11 for washing with ozonized water, followed by the draining tank 12.

The tank 11 again has a substantially parallelepipedal shape here and it again displays, in considering the direction of movement of the products P in the plant, the presence of a front wall 35, two side walls 36 and 37, an outlet wall 38 and a wall 39 forming the base of the tank.

The system for the injection of ozonized water is here formed by a first series of front nozzles 30 complemented by a series of three knives for recirculated ozonized water 31 emerging in the tank in the base wall 39.

Here again, it is seen that the injection system represented in the context of FIGS. 3 and 3A introduces an extremely effective solution to the technical problem on which the present invention is based by introducing efficient control of the stirring of the water in the tank and therefore of the progress of the products inside this tank, that is to say necessarily of the residence time of the products and of the contact time of these products with the ozone dissolved in the water in the tank.

Here again, it should be noted that, according to an advantageous embodiment of the invention, the ozonized water knives 31 operate in a sequential fashion, that is to say that they are started up one after the other in considering the direction of progression of the products in the tank.

A plant such as that described in relation to FIG. 2 was used to treat carrots according to the invention, for the purpose of manufacturing grated carrots.

The plant therefore comprises a single washing tank 11, followed by a recovery tank 12.

The first tank has a volume of 900 liters and is equipped, in terms of nozzles for the recirculation of water, in the following way:

a first series of two front nozzles 20;

a second series of seven side nozzles 21a situated in the vicinity of the base of the tank;

a second series of seven side nozzles 21b, which can be swivelled, situated in the top part of the tank at the limit of the surface of the liquid.

A set of valves makes it possible, of course, to adjust the hydraulic flow rates and therefore the progression and the quality of the mixing of the products with the ozonized water in the tank.

The total flow rate of injected recirculated water was in the region of 30 m$^3$/h, the diameter of the top side nozzles being in the region of 10 mm, whereas the diameter of the bottom side nozzles was in the region of 20 mm.

The contact time of the products with the ozonized water was, in such a configuration, in the region of a minute.

FIGS. 4, 5, 6, and 7 illustrate the comparative results obtained using such a configuration in the case of the treatment of carrots, the carrots being grated after treatment and monitored from the microbiological viewpoint and the viewpoint of the vitamins.

Figure 4:
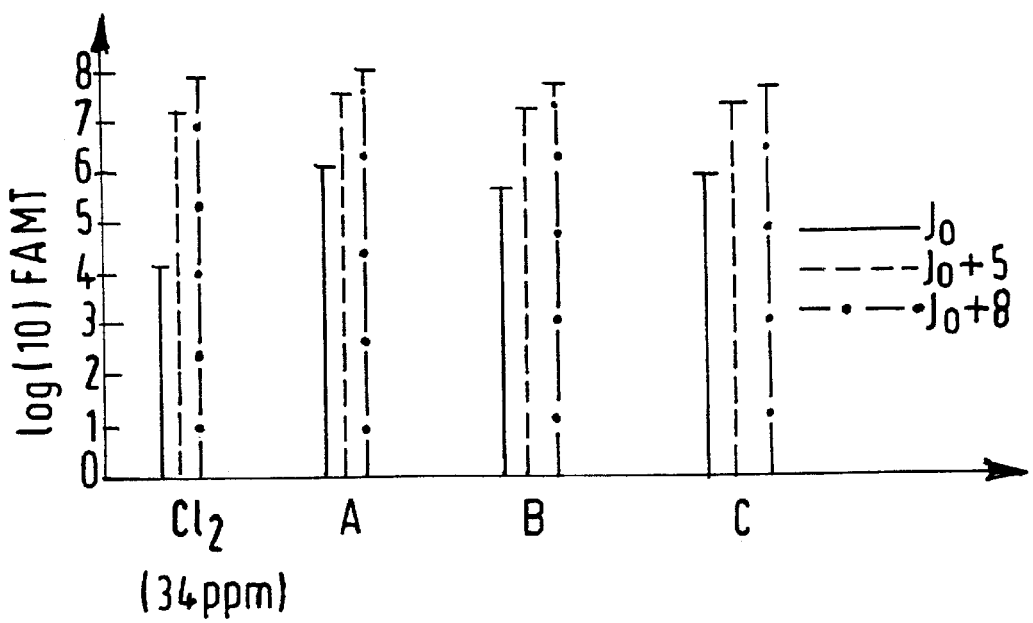
FIG. 4 illustrates the results obtained according to the invention using a plant in accordance with FIG. 2 in the case of grated carrots and the comparison of these results with those obtained according to the state of the art by chlorinated washing.

Thus, FIG. 4 illustrates the comparative results obtained in the case of the treatment of carrots, the carrots being grated after treatment and monitored from the TMAF viewpoint. The results presented on the ordinate are therefore the $\log_{10}$ of the TMAF total flora, whereas, on the abscissa, the results obtained for four batches of carrots have been represented, respectively: a first batch treated according to the usual process of the site of use of washing with chlorinated water (34 ppm of chlorine) and then successively batches A, B and C treated with ozonized water according to the invention.

In all cases, three types of results are provided, the log of the total flora at $D_0$ (immediately after treatment), at $D_0+5$ and at $D_0+8$ days.

In the cases A, B and C of washing with ozonized water according to the invention, the level of ozone dissolved in the water in the tank was in the region of 2.6 ppm, for a contact time of the products with the ozonized water in the region of a minute.

On interpreting this figure, the fact is then clearly found that the results obtained by washing with ozonized water according to the invention are entirely comparable to those obtained by the site of use by washing with chlorinated water, the results being entirely reproducible over several treated batches of carrots.

Figure 5:
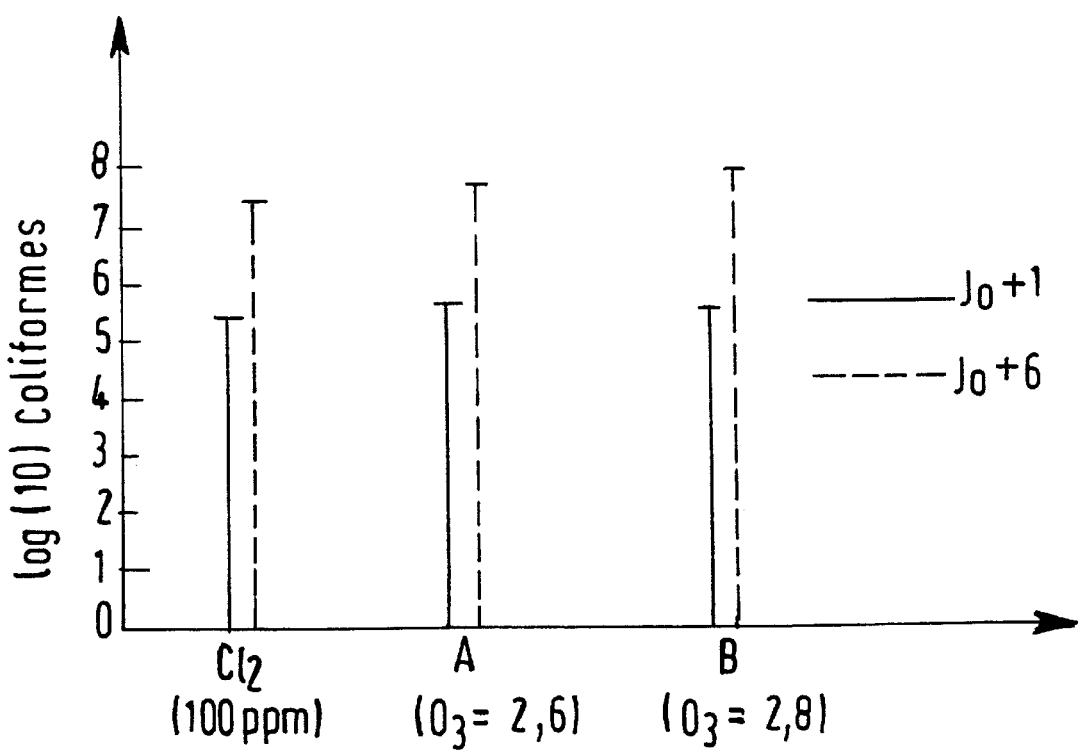
FIG. 5 also illustrates results obtained according to the invention on grated carrots, this time in terms of $\log_{10}$ of coliforms.

FIG. 5 this time illustrates the results obtained in terms of $\log_{10}$ of coliforms.

Here, a first batch of carrots, treated with chlorinate water according to the usual washing process on the site of use, and a batch A and a batch B, washed with ozonized water according to the invention with levels of dissolved ozone of approximately 2.6 mg/l and 2.8 mg/l respectively, were compared. The contact time in the case of the washing operations with ozonized water was, in this instance, in the region of 80 seconds.

It should be noted that, in the case of the washing with chlorinated water, a dose of 100 ppm of chlorine in the washing water was used here, which already represents a high dose, greater than that which is conventionally used by the food industry.

Finally, it should be noted that two types of results are represented here: by a continuous line, the log at time $D_0+1$ ($D_0$ representing the moment immediately after treatment), and, by a broken line, the log at $D_0+6$ days.

Here again, the interpretation of FIG. 5 unambiguously shows that, in terms also of coliforms, the grated carrots obtained from carrots treated according to the invention are of a quality at least equivalent to that of the carrots obtained by washing with chlorinated water, while it should be again emphasized that the level of chlorine in the water used for the first comparative test, that is to say 100 ppm, is already highly significant.

Furthermore, the vitamins in the grated carrots obtained from carrots treated with ozonized water according to the invention were monitored and the results obtained were compared with those obtained in the case of carrots washed with chlorinated water comprising 100 ppm of chlorine.

Figure 6:
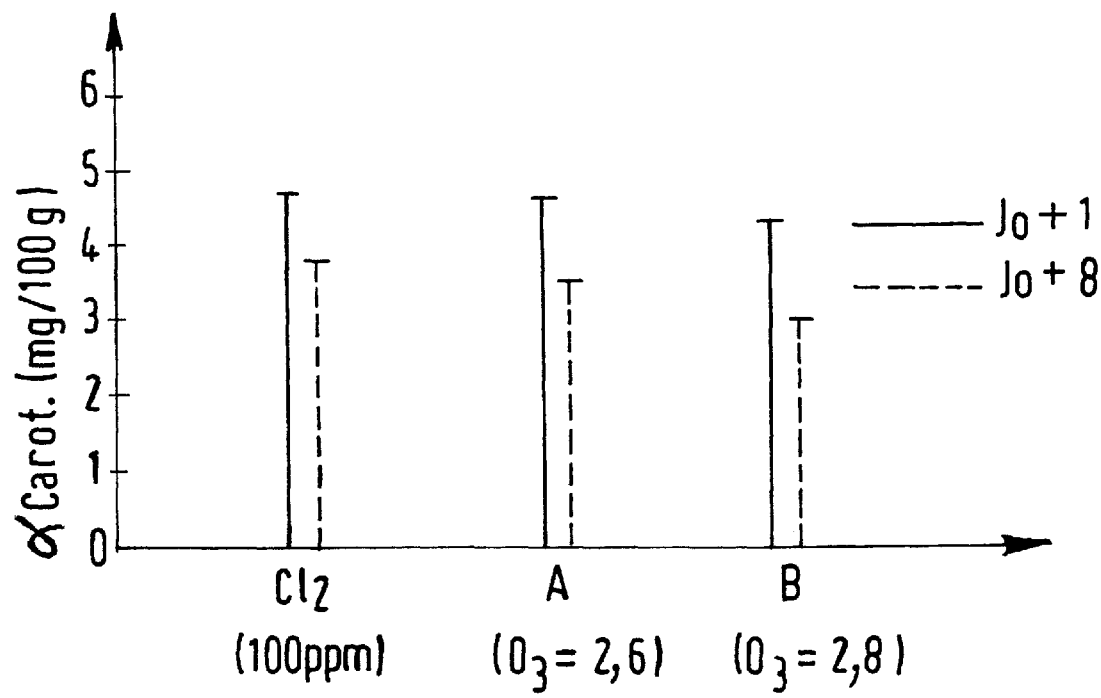
FIGS. 6 and 7 illustrate, for their part, the monitoring of vitamins in grated carrots treated according to the invention, FIG. 6 corresponding to the results of α-carotene content and FIG. 7 corresponding to the results obtained in terms of β-carotene content.
Figure 7:
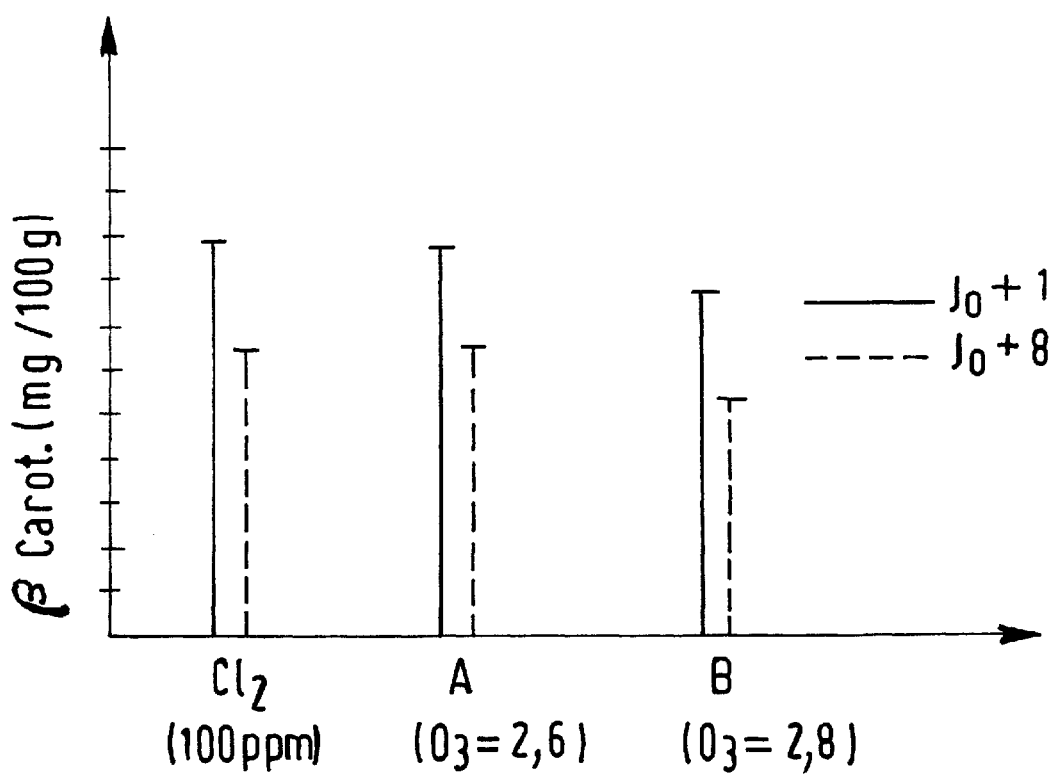

The corresponding results are reported in the context of FIGS. 6 and 7, FIG. 6 illustrating the results of α-carotene content and FIG. 7 illustrating the results of β-carotene content.

Here again, the following batches are compared: a batch of grated carrots corresponding to carrots treated with chlorinated water according to the process of the site of use, the content of chlorine in the washing water being highly significant (100 ppm), a batch A of grated carrots corresponding to carrots washed according to the invention using a content of ozone in the washing water in the region of 2.6 ppm, and a batch B here again washed according to the invention using a content of ozone in the region of 2.8 ppm (in both the cases of washing according to the invention, the mean contact time was in the region of 80 seconds).

Finally, it should be noted that, for each batch, two types of evaluation were carried out, and evaluation 24 hours after washing (continuous lines in the figure) and an evaluation 8 days after washing (broken lines in the figure).

On interpreting these figures, it is then found that at least one of the treatments with ozonized water carried out according to the invention (that using 2.6 ppm of dissolved ozone) maintains the vitamin content of the grated carrots in a way entirely comparable to the washing with chlorinated water according to the state of the art.

Although the present invention has been disclosed with regard to specific embodiments, it is not at all limited to them but is, on the contrary, capable of modifications and of alternative forms which will appear to a person skilled in the art in the context of the claims hereinbelow.

What is claimed is:

1. A process for treating a product comprising the steps of:

contacting the product with a solution of ozonized water subjected to stirring during all or part of the contacting, wherein all or part of the stirring is hydraulic in origin;

recirculating at least a portion of the solution contacted with the product to one or more points where said contacting step occurs so as to establish turbulent water conditions capable of allowing achievement of a sufficient contact time between the product and the ozone dissolved in the water to attain a predetermined level of treatment, wherein said contacting step and said recirculating step take place in a treatment tank, and further comprising adjusting the flow rate of the recirculated solution injected into the tank in order to control the progress of the products in the tank and to obtain the sufficient contact time.

2. The process according to claim 1, wherein said step of recirculating at least a portion of the solution comprises reintroducing the recirculated solution at one or more points in said tank.

3. The process according to claim 2, wherein said at least one treatment tank is substantially parallelepipedal in shape, thus defining a front wall of the tank, side walls and one or more walls forming a base of the tank and wherein said one or more points in said tank comprise an inlet or inlets for said recirculated solution.

4. The process according to claim 3, wherein said inlet or inlets for the recirculated solution in the structure of the tank are positioned according to one or more combinations of the following configurations:

said inlet or inlets for recirculated solution comprise at least one linear sequence or series of injection nozzles emerging in the tank on at least one of its side walls;

said inlet or inlets for recirculated solution comprise at least one linear sequence or series of injection nozzles emerging in the tank on its front wall;

said inlet or inlets for recirculated solution comprise at least one knife emerging in the tank on the wall or walls forming the base of this tank.

5. The process according to claim 4, wherein said inlet or inlets for recirculated solution comprise at least two linear sequences or series of injection nozzles emerging in the tank on at least one of these side walls, the linear sequences or series being operated substantially in order to obtain said sufficient contact time.

6. The process according to claim 4, wherein said inlet or inlets for recirculated solution comprise at least two linear sequences or series of injection nozzles emerging in the tank on its front wall, the linear sequences or series being operated sequentially in order to obtain said sufficient contact time.

7. The process according to claim 4, wherein said inlet or inlets for recirculated solution comprise at least two knives emerging in the tank on the wall or walls forming the base of this tank, the knives being operated sequentially in order to obtain said sufficient contact time.

8. The process according to claim 1, wherein said turbulent conditions are obtained by arranging a degree of recirculation of water in the tank corresponding to 5 to 50 volumes of the tank per hour.

9. The process according to claim 1, wherein said solution of ozonized water fed into said tank comprises between 0.1 and 20 ppm of ozone.

10. The process according to claim 9, comprising between 0.5 and 15 ppm of ozone in said ozonized water.

11. The process according to claim 9, further comprising the step of regulating the content of ozone dissolved in the solution present in the treatment tank within the range 0.1 to 10 ppm.

12. The process according to claim 11, further comprising the step of regulating the content of ozone dissolved in the solution present in the treatment tank within the range 0.5 to 5 ppm.

13. The process according to claim 1, wherein said treatment comprises bleaching, disinfecting or deodorizing.

14. The process according to claim 1, wherein said product is a food product.

15. A plant for treatment of a product comprising:
at least one stage in which the product is brought into contact with a solution of ozonized water in at least one treatment tank capable of being fed with ozonized water in order to carry out the treatment,
a hydraulic stirrer which stirs said solution stirring during all or part of the contacting stage and establishes, within the tank, turbulent water conditions which allow the achievement of a sufficient contact time between the product and the ozone dissolved in the solution to attain a predetermined level of treatment, wherein the hydraulic stirrer is effective to establish said turbulent water conditions by reintroducing into the tank an amount of the solution removed from the tank, and
wherein the hydraulic stirrer is effective to control the progress of the products in the tank by adjusting the flow rate of the recirculated solution injected into the tank.

16. The plant according to claim 15, wherein said at least one treatment tank is substantially parallelepipedal in shape, thus defining a front wall of the tank, side walls and a wall forming the base of the tank.

17. The plant according to claim 16, further comprising one or more conduits which recirculate at least a portion of the solution in the tank in order to reintroduce this recirculated solution into the tank at one or more points in its structure.

18. The plant according to claim 17, wherein said one or more conduits comprise inlets for recirculated solution in the structure of the tank which are positioned according to one or more combinations of the following configurations:
said inlet or inlets for recirculated solution comprise at least one linear sequence or series of injection nozzles emerging in the tank on at least one of its side walls;
said inlet or inlets for recirculated solution comprise at least one linear sequence or series of injection nozzles emerging in the tank on its front wall;
said inlet or inlets for recirculated solution comprise at least one knife emerging in the tank on the wall or walls forming the base of this tank.

* * * * *